March 28, 1950 — E. R. BURROUGHES — 2,502,202
UNITARY INDUCTOR AND TRIMMING CAPACITOR
Filed July 17, 1945

INVENTOR.
Eric R. Burroughes,
BY
H. S. Grover
ATTORNEY

Patented Mar. 28, 1950

2,502,202

UNITED STATES PATENT OFFICE 2,502,202

UNITARY INDUCTOR AND TRIMMING CAPACITOR

Eric Randall Burroughes, Danbury, England, assignor to Radio Corporation of America, a corporation of Delaware Application July 17, 1945, Serial No. 605,545
In Great Britain April 26, 1944

Section 1, Public Law 690, August 8, 1946
Patent expires April 26, 1964

9 Claims. (Cl. 250—40)

The present invention relates to an inductor and a trimming capacitor combined to constitute a single unit.

By means of the invention, there is provided a unit comprising an inductor and trimming capacitor of small size, of which the values of both the inductance and capacity can be adjusted, independently of one another, from one and the same end of the unit, which is completely sealed, and which can be mounted by a single fixture.

According to the invention an inductor and trimming capacitor combined to constitute a single unit, consists of two insulating tubes preferably of equal external diameters, coaxially mounted by being attached at adjacent ends to a metallic plug, one of the said tubes having attached to its outer surface one electrode of the capacitor, the other electrode of which consists of a metallic tube slidable within said one tube, and the other of said tubes having wound about its outer surface the coil of the inductor, an iron core for which is accommodated within said other tube, the two tubes being closed at their two remote ends by two metallic plugs, one at each end. If desired, the whole unit may be enclosed within a coaxially disposed outer tube of insulating material which is likewise closed at its two ends by said two metallic plugs.

One of the said two plugs may be provided on its outer surface with a centrally apertured sleeve which is internally and externally threaded, the external thread serving as a means for mounting the unit, and the internal thread serving for the longitudinal adjustment of a threaded rod to which the said other electrode of the capacitor is attached and by which its position within said one tube can be adjusted.

The end of the threaded sleeve may be split and tapered, and provided with a nut whereby the said threaded rod may be locked in position.

The said threaded rod may be centrally bored to accommodate a second rod which extends through a central threaded aperture in the metallic plug by which the two insulating tubes are connected together and which at its one end carries said iron core (preferably iron-dust) for the said inductor. The said threaded rod may extend beyond the end of the said sleeve, may be split and threaded externally, and provided with a nut whereby the said second rod may be locked in position.

Figure 1:
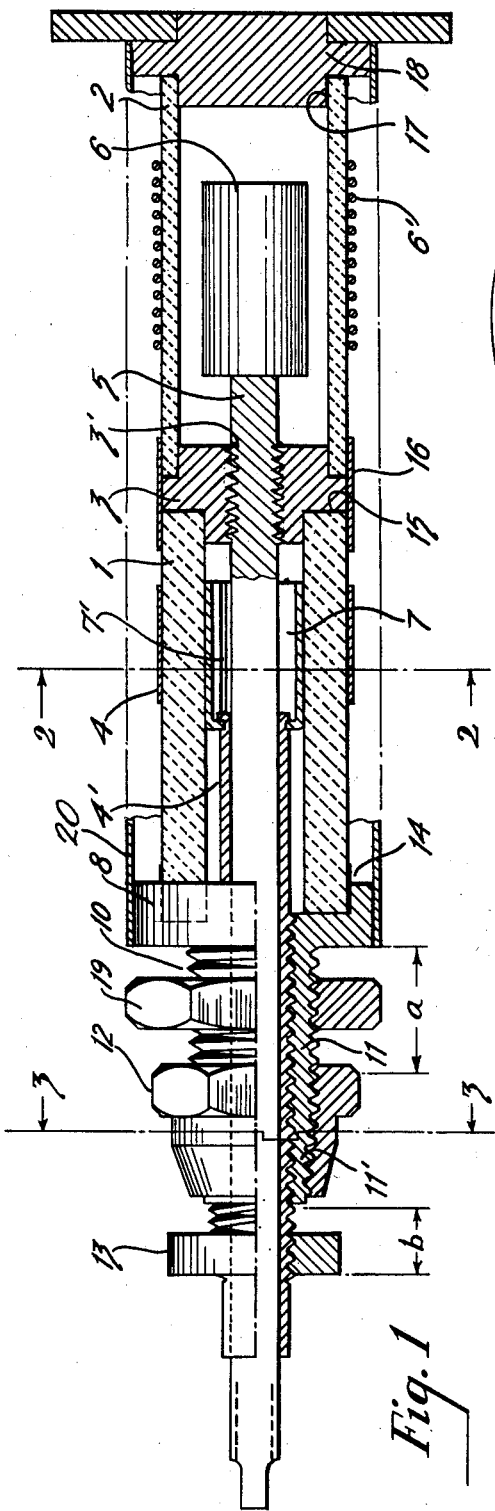
Figure 2:
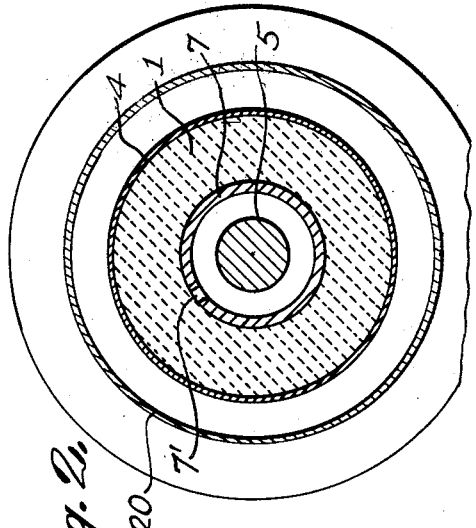
Figure 3:
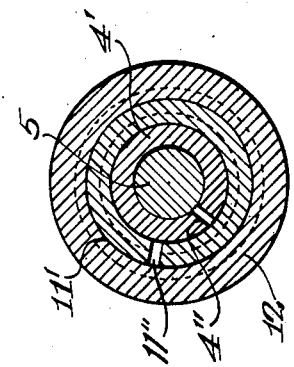

An embodiment of the invention will now be described more fully in connection with the accompanying drawings in which Fig. 1 is a longitudinal cross-sectional view, partly in elevation, of the embodiment; and Figs. 2 and 3 are sectional views on lines 2—2 and 3—3, respectively, of Fig. 1.

Two ceramic tubes, 1 and 2, of the same external diameter have their two ends 14, 15, 16 and 17 metallized, as with silver for example. By means of solder the two said tubes are secured to a metal, for example brass, central plug 3 having the same external diameter as the two tubes but having also reduced diameters for insertion into the two ceramic tubes. Central plug 3 is centrally bored as at 3' and the bore hole may be threaded. The two tubes are coaxial with each other, with the central plug, and with the bore hole.

One of the tubes, namely tube 1, is metallized as at 4, for example silvered, around its outer surface for a desired distance along its length. This metallized part constitutes the outer electrode of a condenser.

The other of the tubes, namely 2, is provided with a coil winding 6' of a desired number of turns of conductor of a desired gauge of wire.

A first rod 5, carrying an iron-dust core 6, extends through the central plug 3 with the iron-dust core 6 accommodated within tube 2 the rod extending through and beyond tube 1. Thus by means of the rod 5 the position of the core within tube 2 can be longitudinally adjusted. A threaded tube 4' carries at one end a cylindrical electrode 7 which is accommodated within tube 1. The cylindrical electrode 7 is split longitudinally at 7' (Fig. 2) and sprung so that it makes a sliding friction fit within tube 1. Electrode 7 is not rigidly fixed to tube 4', and thus does not rotate with the tube. By thus maintaining a constant angular relationship to the metallized surface of the tube no inconstant change in capacity due to rotary movement of electrode 7 is introduced.

An end cap 8 is secured to the metallized end of tube 1 and has an external diameter greater than that of the tubes. This end cap is provided on the outside with a threaded sleeve 10 which serves a variety of purposes. Adjacent the point where it is joined to end cap 8, the sleeve is, for a part $a$ of its length, of constant diameter, this part serving as a means for securing the unit into a threaded base or other fixture and holding it in place with nut 19. For the remainder of its length at 11' the sleeve is tapered and near its end is also split longitudinally at 11'' (Fig. 3). End cap 8 as well as sleeve 10 are centrally bored and the bore hole is threaded. The threaded tube 4', extends through end cap 8 and its sleeve 10, so that by rotation of this tube the position of the inner electrode 7 of the condenser can be longitudinally adjusted. A locking nut 12 threaded onto the tapered end 11' of the sleeve serves as a means for locking the threaded tube and thus the inner electrode in any position to which it may be adjusted.

Rod 5 extends through this threaded tube 4' which is not internally threaded but is tapered near its end for the distance b and is provided also with a longitudinal split 4" (see Fig. 3). A locking nut 13 threaded onto the tapered end of tube 4' serves as a means for locking rod 5 and thus the iron-dust core in any position to which it may be adjusted.

An end cap 18 is fixed to the metallized end 17 of tube 2 and may have an external diameter greater than that of the tube but equal to that of the left-hand end cap.

Over the whole of the elements so far referred to and assembled, a ceramic tube 20 internally metallized, for example, silvered, at both ends is secured to the two end caps 8 and 18 thus sealing the whole of the device against the entry of moisture or dust.

After such adjustments of the position of the core or of the central electrode of the condenser or both, as may be required, the seal is completed by the use of a suitable varnish over the adusting and locking screws and nuts.

It will be appreciated that the end cap 8 used as a mounting is connected to the moving electrode of the condenser. In most cases the inductance will be connected directly across the condenser so that the mounting may be used for the "earthy" or low potential terminal of the unit. The other connection, or connections where a primary or secondary winding is also included, would be brought out at the free end of the assembly. This would be done by using a ceramic end cap with terminal wires soldered in and the internal connection would be made before the protecting tube is put on and soldered in position.

The assembly can of course, be used without the outer protecting tube where only temperate climatic conditions are to be experienced.

What I claim is:

1. A unitary inductor and capacitor device, comprising: a pair of dielectric tubes; connecting structure holding said tubes together in aligned position; a fixed capacitor electrode mounted on the outer surface of one of said tubes; a second cooperating capacitor electrode slidably mounted within said one tube; a coil wound about the outer surface of the other of said tubes; an inductance-varying core slidably mounted within said other tube; and adjusting elements connected to said slidable electrode and said core, and extending out from one end of said aligned tubes for independently adjusting said slidable capacitor electrode and said core from said end.

2. A unitary inductor and capacitor device as defined in claim 1, wherein the connecting structure is electrically conductive.

3. A unitary inductor and capacitor device as defined in claim 1, including end plugs secured to the opposite ends of said aligned tubes, and wherein there is provided an outer enveloping tube sealed at its two ends to the two end plugs.

4. In a unitary inductor and capacitor device in which the inductance of the inductor and the capacitance of the capacitor are independently adjustable: an elongated tube at least portions of which are of dielectric composition; a first capacitor electrode positioned interiorly of a first dielectric portion of said tube and movable lengthwise of the tube; a second capacitor electrode fixedly held around said first dielectric tube portion in at least partially overlapping relation with said first electrode; said first and second electrodes and the intervening dielectric tube portion forming a capacitor; an inductor winding held around a second dielectric portion of said tube spaced from said first dielectric tube portion; an inductance-varying core movably positioned at least partially within said second dielectric tube portion; and independent adjusting elements separately connected to said first capacitor electrode and to said core for adjustably moving them independently lengthwise of the tube, said independent adjusting elements extending out from one end of the tube and providing adjustment controls externally actuable from said one end.

5. The combination as defined by claim 4 in which the tube has a cylindrical internal surface, and the first capacitor electrode is resiliently biased outwardly against said surface for diminishing any tendency of said first electrode to rotate with respect to the second electrode.

6. The combination as defined by claim 5 in which the adjusting elements include an elongated capacitance adjusting member threadedly held within the tube for longitudinal adjustment by rotation; the capacitance adjusting member is pivotally linked with the first capacitor electrode for moving this electrode essentially only longitudinally.

7. The combination as defined by claim 4 in which the independent adjusting elements include an elongated capacitance adjusting member and an elongated inductance adjusting member, at least one of said elongated adjusting members being tubular and surrounding the other.

8. The combination as defined by claim 1 in which the connecting structure has a passageway extending longitudinally of the aligned tubes, and the adjusting elements include an elongated tubular member and a second elongated member, said tubular member being secured to the slidable electrode for moving it longitudinally, and said second elongated member being secured to the core and extending through the tubular member and the passageway.

9. The combination as defined by claim 8 in which the second elongated member is threadedly received in the passageway for adjusting the inductance by rotation with respect to the aligned tubes.

ERIC RANDALL BURROUGHES.

REFERENCES CITED

The following references are of record in the file of this patent:

UNITED STATES PATENTS

| Number | Name | Date |
|---|---|---|
| 1,582,555 | Stoekle | Apr. 27, 1926 |
| 2,059,816 | Schwartzhaupt | Nov. 3, 1936 |
| 2,073,940 | Landon et al. | Mar. 16, 1937 |
| 2,147,425 | Bock | Feb. 14, 1939 |
| 2,338,134 | Sands et al. | Jan. 4, 1944 |
| 2,394,391 | Martowicz | Feb. 5, 1946 |
| 2,398,112 | O'Brien | Apr. 9, 1946 |
| 2,403,349 | Dolberg | July 2, 1946 |

FOREIGN PATENTS

| Number | Country | Date |
|---|---|---|
| 440,950 | Great Britain | Jan. 6, 1936 |
| 556,167 | Great Britain | Sept. 22, 1943 |
| 560,372 | Great Britain | Mar. 31, 1944 |